US012561962B2

(12) United States Patent
Cheng et al.

(10) Patent No.: US 12,561,962 B2
(45) Date of Patent: Feb. 24, 2026

(54) SYSTEMS AND METHODS FOR MULTIMODAL FUSION OF MISSING AND UNPAIRED IMAGE AND TABULAR DATA FOR DEFECT CLASSIFICATION

(71) Applicant: Samsung Display Co., Ltd., Yongin-si (KR)

(72) Inventors: Qisen Cheng, San Jose, CA (US); Shuhui Qu, San Jose, CA (US); Kaushik Balakrishnan, San Jose, CA (US); Janghwan Lee, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 324 days.

(21) Appl. No.: 18/339,075

(22) Filed: Jun. 21, 2023

(65) Prior Publication Data

US 2024/0312193 A1      Sep. 19, 2024

Related U.S. Application Data

(60) Provisional application No. 63/452,638, filed on Mar. 16, 2023.

(51) Int. Cl.
*G06V 10/80*          (2022.01)
*G06T 7/00*          (2017.01)

(52) U.S. Cl.
CPC .......... *G06V 10/803* (2022.01); *G06T 7/0004* (2013.01); *G06T 2207/20081* (2013.01)

(58) Field of Classification Search
CPC .............................. G06V 10/803; G06T 7/004
See application file for complete search history.

(56) References Cited

U.S. PATENT DOCUMENTS

| | | | |
|---|---|---|---|
| 8,843,423 B2 | 9/2014 | Chu et al. | |
| 11,488,694 B2 | 11/2022 | Malone et al. | |
| 11,921,824 B1* | 3/2024 | Hester | G06N 3/045 |
| 2020/0234086 A1* | 7/2020 | Taha | G06N 3/09 |
| 2020/0372369 A1* | 11/2020 | Gong | G06N 3/088 |
| 2023/0045548 A1* | 2/2023 | Yakut | G06N 3/09 |

(Continued)

FOREIGN PATENT DOCUMENTS

CN          113706558 A      11/2021

OTHER PUBLICATIONS

Lee, Mihee et al, Private-Shared Disentangled Multimodal VAE for Learning of Latent Representations, Dec. 23, 2020 (Year: 2020).*

(Continued)

*Primary Examiner* — Kevin Ky
(74) *Attorney, Agent, or Firm* — Womble Bond Dickinson (US) LLP

(57)          ABSTRACT

A method may include providing a data set including rows of data. The rows of data may include at least one row of unpaired modality including a first modality, and at least one row of paired modality may include both the first modality and a second modality. The method may further include imputing, by a modality-specific encoder, the at least one row of unpaired modality by interpolating embeddings from the second modality of the paired modality; training, in a latent space, the modality-specific encoder based on the imputation for unimodal prediction and bimodal prediction; and generating a confidence value for the unimodal prediction and the bimodal prediction.

20 Claims, 9 Drawing Sheets

(56) References Cited

U.S. PATENT DOCUMENTS

| | | | | |
|---|---|---|---|---|
| 2023/0117247 | A1* | 4/2023 | Xiao | G06N 3/082 |
| | | | | 706/15 |
| 2023/0255564 | A1* | 8/2023 | Pascual-Leone | A61B 5/0022 |
| | | | | 600/301 |
| 2024/0134937 | A1* | 4/2024 | Ni | G06F 18/217 |
| 2024/0297957 | A1* | 9/2024 | Bakunov | G06V 10/945 |
| 2024/0312193 | A1* | 9/2024 | Cheng | G06T 7/0004 |
| 2024/0374136 | A1* | 11/2024 | Sørensen | A61B 5/0015 |
| 2025/0166746 | A1* | 5/2025 | Balazard | G06V 20/695 |

OTHER PUBLICATIONS

EPO Extended European Search Report issued in corresponding EP Application No. 24163661.2, dated Jul. 31, 2024, 11 pages.

Gorishniy, Y. et al., "Revisiting Deep Learning Models for Tabular Data," arXiv:2106.11959v2, Nov. 10, 2021, 25 pages, www.arXiv.org.

Han, H. et al., "SSGD: A Smartphone Screen Glass Dataset for Defect Detection," arXiv:2303.06673v1, Mar. 12, 2023, 5 pages, www.arXiv.org.

Lee, M. et al., "Explainable AI for domain experts: a post Hoc analysis of deep learning for defect classification of TFT-LCD panels," Journal of Intelligent Manufacturing, vol. 33, Mar. 2021, pp. 1747-1759.

Liang, P. et al., "Foundations & Recent Trends in Multimodal Machine Learning: Principles, Challenges, & Open Questions," arXiv:2209.03430v1, Sep. 7, 2022, 65 pages, www.arXiv.org.

Ma, M. et al., "Are Multimodal Transformers Robust to Missing Modality?", 2022 IEEE/CVF Conference on Computer Vision and Pattern Recognition (CVPR), 2022, pp. 18156-18165.

Bahari, Dara et al., "SCARF: Self-Supervised Contrastive Learning Using Random Feature Corruption," Published as a conference paper at ICLR 2022, 24 pages.

Gorishniy, Y., et al., "Revisiting Deep Learning Models for Tabular Data," 35th Conference on Neural Information Processing Systems (NeurIPS 2021), 12 pages.

He, K., et al., "Masked Autoencoders Are Scalable Vision Learners," IEEE Xplore, 10 pages.

Jain, D.K., et al., "Employing Co-Learning to Evaluate the Explainability of Multimodal Sentiment Analysis," IEEE Transaction on Computational Social Systems, Dec. 8, 2022, 8 pages.

Jethani, N., et al., "FastSHAP: Real-Time Shapely Value Estimation," Published as a conference paper at ICLR 2022, 23 pages.

Joshi, G., et al., "A Review on Explainability in Multimodal Deep Neural Nets," IEEE Access, Apr. 26, 2021, 22 pages.

Ma, M., et al., "SMIL: Multimodal Learning with Severely Missing Modality," The Thirty-Fifth AAAI Conference on Artificial Intelligence, (AAAI-21) (www.aaai.org), 2019, 9 pages.

Ma, M., et al., "Are Multimodal Transformers Robust to Missing Modality?" IEEE Xplore, 10 pages.

Yoon, J., et al., "VIME: Extending the Success of Self- and Semi-supervised Learning to Tabular Domain," 34th Conference on Neural Information Processing Systems (NeurIPS 2020), Vancouver, Canada, 11 pages.

* cited by examiner

FIG. 5

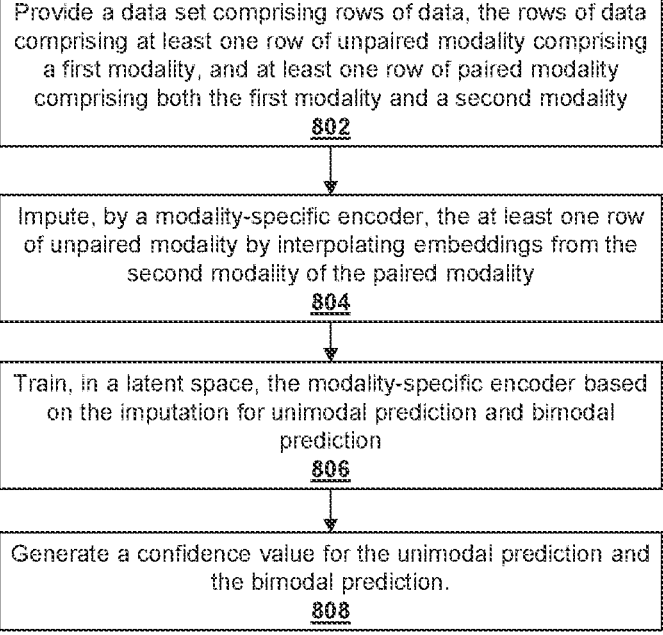

Provide a data set comprising rows of data, the rows of data comprising at least one row of unpaired modality comprising a first modality, and at least one row of paired modality comprising both the first modality and a second modality
802

Impute, by a modality-specific encoder, the at least one row of unpaired modality by interpolating embeddings from the second modality of the paired modality
804

Train, in a latent space, the modality-specific encoder based on the imputation for unimodal prediction and bimodal prediction
806

Generate a confidence value for the unimodal prediction and the bimodal prediction.
808

FIG. 8

SYSTEMS AND METHODS FOR MULTIMODAL FUSION OF MISSING AND UNPAIRED IMAGE AND TABULAR DATA FOR DEFECT CLASSIFICATION

CROSS-REFERENCE TO RELATED APPLICATION(S)

This application claims the priority benefit under 35 U.S.C. § 119(e) of U.S. Provisional Application No. 63/452, 638, filed on Mar. 16, 2023, the disclosure of which is incorporated by reference in its entirety as if fully set forth herein.

TECHNICAL FIELD

The disclosure generally relates to deep learning. More particularly, the subject matter disclosed herein relates to systems and methods for multimodal fusion of missing and unpaired image and tabular data for defect classification.

SUMMARY

TV and mobile display industries have been growing rapidly over the years. As new types of display panel modules and production methods are designed, enhanced equipment and quality controlling methods are desired to maintain quality during production because defects in the display panels may lead to excessive costs and losses. Closely monitoring for the presence of defects that may result during production may help reduce such costs and losses.

For instance, some defects that result during production are repairable. To minimize the loss due to these defects, repairable defects may be identified by using sensory equipment to gather certain data regarding the display panels. However, large scale production and microscopic sizes of potential defects make it difficult for a human operator to find these defects. Instead, many modern techniques utilize computers to gather sensory data from various types of sensors to determine potential defects in the manufactured displays. For example, sensors such as optical or infrared cameras may be utilized to capture images of various portions of the display panels and computer vision may be utilized to identify certain features and/or characteristics of the display panels, and then make a determination as to whether or not the display panels are produced correctly and accurately according to manufacturing standards and tolerances. As another example, laser may be utilized to measure various aspects of the display panel to ensure the display panels are manufactured according to expected dimensions and within certain tolerances. Accordingly, computers may utilize such sensory data to automatically determine defects in the production so that either such defects can be repaired or the conditions of the production process or machinery that are causing such defects may be corrected to prevent further defects.

Accordingly, the gathered sensory data for display panels can often be comprised of two modalities—images and tabular data. The images may be provided from cameras that capture, for example, a top-view of the display panels while the tables record measurements (e.g., dimensions) and other associated information. To effectively classify repairable and unrepairable defects, a multimodal classifier may be utilized to fuse the information from both modalities. In other words, an image is associated with a corresponding tabular data so that the computer software utilizing artificial intelligence (AI) may be trained by utilizing such fused model to determine the presence of defects. More particularly, some multimodal fusion techniques rely on complete and paired modalities, wherein each image is paired with a corresponding row of tabular data. However, it is often hard to obtain a modal-complete and paired dataset for modal training due to reasons like missing recordings or heterogeneous sources. A common situation is that that a dataset includes a mixture of dataset that contains only a small portion of modal-complete and paired data while the rest of the data are either an image with a missing tabular data or tabular data with a missing image. Thus, it is not always guaranteed to have both modalities available for test samples. Therefore, a method for performing multimodal fusion that can effectively learn from a dataset with missing and/or unpaired modalities for highly accurate classification, and robust to test-time missing modality is desired.

According to an embodiment of the present disclosure, a method may include: providing a data set including rows of data, the rows of data including at least one row of unpaired modality including a first modality, and at least one row of paired modality including both the first modality and a second modality; imputing, by a modality-specific encoder, the at least one row of unpaired modality by interpolating embeddings from the second modality of the paired modality; training, in a latent space, the modality-specific encoder based on the imputation for unimodal prediction and bimodal prediction; and generating a confidence value for the unimodal prediction and the bimodal prediction.

The generating the confidence value may include computing Shapley-based explanations for the unimodal prediction and the bimodal prediction.

The computing the Shapley-based explanations may include comparing an impact of the unimodal prediction and an impact of the bimodal prediction with a predetermined threshold.

The method may further include selecting either the unimodal prediction or the bimodal prediction based on the generated confidence value.

The second modality may be a missing modality from the unpaired modality, wherein the interpolating the embeddings includes selecting K priors of the second modality, the K priors being the second modality embeddings of K samples of the at least one row of paired modality having closest embeddings of observed modality.

The method may further include computing a weighted sum of the K priors by taking a cross-attention between the K samples and the K priors.

The first modality may correspond to an image modality and the second modality may correspond to a tabular modality.

The first modality may correspond to a tabular modality and the second modality corresponds to an image modality.

The method may further include training the modality-specific encoder for image modality by performing Vision Transformer.

The method may further include training the modality specific encoder for tabular data modality by performing Feature-Tokenizer Transformer.

According to another embodiment of the present disclosure, a system may include: a memory; and a processor configured to execute instructions stored in the memory to perform operations including: providing a data set including rows of data, the rows of data including at least one row of unpaired modality including a first modality, and at least one row of paired modality including both the first modality and a second modality; imputing, by a modality-specific encoder, the at least one row of unpaired modality by interpolating embeddings from the second modality of the paired modality; training, in a latent space, the modality-specific encoder based on the imputation for unimodal prediction and bimodal prediction; and generating a confidence value for the unimodal prediction and the bimodal prediction.

The generating the confidence value may include computing Shapley-based explanations for the unimodal prediction and the bimodal prediction.

The computing the Shapley-based explanations may include comparing an impact of the unimodal prediction and an impact of the bimodal prediction with a predetermined threshold.

The operations may further include selecting either the unimodal prediction or the bimodal prediction based on the generated confidence value.

The second modality may be a missing modality from the unpaired modality, wherein the interpolating the embeddings includes selecting K priors of the second modality, the K priors being the second modality embeddings of K samples of the at least one row of paired modality having closes embeddings of observed modality.

The operations may further include computing a weighted sum of the K priors by taking a cross-attention between the K samples and the K priors.

The first modality may correspond to an image modality and the second modality corresponds to a tabular modality.

The first modality may correspond to a tabular modality and the second modality corresponds to an image modality.

The operations may further include training the modality-specific encoder for image modality by performing Vision Transformer.

The operations may further include training the modality specific encoder for tabular data modality by performing Feature-Tokenizer Transformer.

BRIEF DESCRIPTION OF THE DRAWINGS

In the following section, the aspects of the subject matter disclosed herein will be described with reference to exemplary embodiments illustrated in the figures, in which:

FIG. 5 is a block diagram of an imputation process for missing modality, according to embodiments of the present disclosure.

FIG. 8 is a flow chart of a method for fusing missing and unpaired image and/or tabular modalities, according to embodiments of the present disclosure.

DETAILED DESCRIPTION

Figure 1:
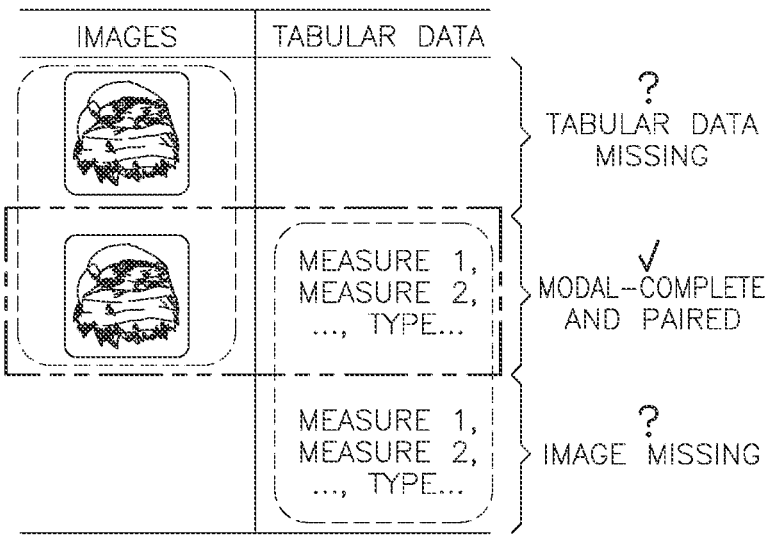
FIG. 1 is an example of captured senor data including images and tabular data, according to embodiments of the present disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 illustrates an example of captured senor data including images and tabular data. More specifically, some rows of data include image modalities, some rows of data include tabular data modalities, and some rows of data include both image and tabular data modalities. Thus, rows that have both an image and a tabular data may be referred to as a paired modality or a complete modality. For purposes of this disclosure, the terms "paired modality," "complete modality," and "completely paired modality" may be used interchangeably. On the other hand, some rows are devoid of or missing an image modality or tabular modality. Such rows may be referred to as unpaired modality or incomplete modality. Nonetheless, captured sensor data results in many unpaired modalities because sensors are do not necessarily always capture both image data and its corresponding tabular data.

If such captured sensor data is used as a model data set of a deep learning model, some techniques are unable to utilize the unpaired modalities. Instead, many techniques are able to only utilize paired modalities, and therefore unpaired modalities may be rendered useless. Thus, one way this requirement of paired modalities is achieved is by ignoring or discarding the incomplete sample (i.e., unpaired modalities). However, this results in a massive waste of data that has already been collected. Another way this requirement is achieved is by imputing zeros or mean values in place of the missing modalities. However, this may be a difficult process for complex modalities such as image modalities. Yet another way this requirement is achieved is by generating the missing modalities from the observed modalities of the corresponding row (e.g., the image modality if the tabular data modality is missing or vice versa). However, the downside of is that this technique relies heavily on correlation between modalities and therefore may be expensive and may be prone to introducing more noise than information. Thus, an improved technique that is less wasteful, less expensive, and less noise generating for utilizing model data sets with missing modalities is desired.

Figure 2:
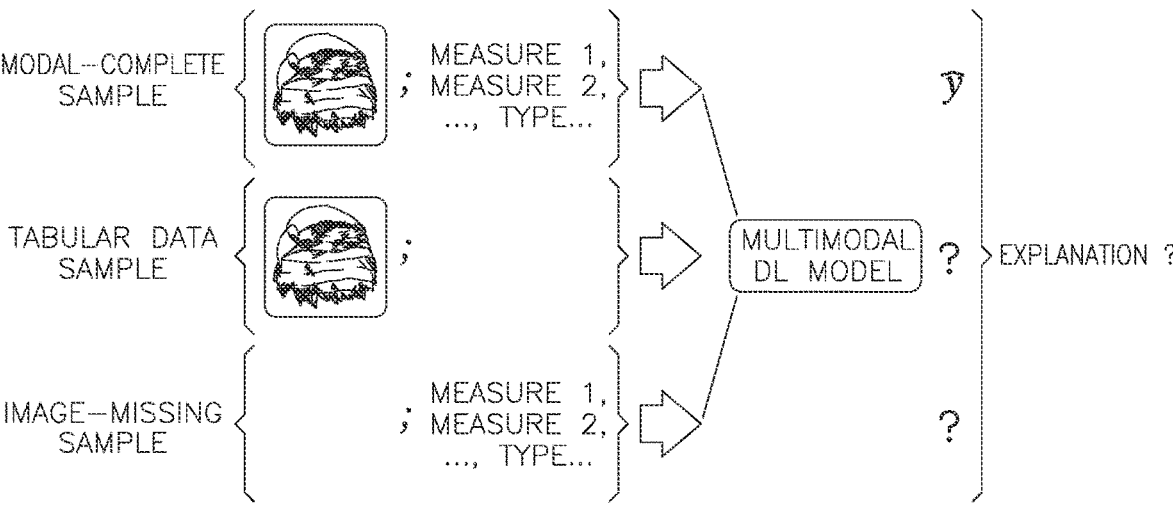
FIG. 2 is an example of the sensor data passing through a multimodal deep learning model, according to embodiments of the present disclosure.

As stated above, although sensor data often has missing modalities, many models are trained on both image and tabular data modalities. Thus, when such model is utilized during testing with the senor data with missing modalities, it turns out that such models are not sufficiently robust to handle such query samples. FIG. 2 illustrates one such example where a multimodal trained model is used with the query sample having one row of completed modalities, one row with tabular data modality missing, and one row with image modality missing. In such case, even if the missing modality is imputed during testing, no quantitative explanation is generated.

Thus, various embodiments of the present disclosure describe techniques to build an effective and efficient framework for training of multimodal defect classifier on data with missing or unpaired modalities. Such framework may be built by training the model to be effective in generating representations for all data. The missing modalities may be imputed efficiently by utilizing data that may be obtained from the paired modalities. In doing so, the modalities may be fused as paired modalities. Once the framework is created, a robust prediction on test sample with missing modality may be achieved by training the model to be effective in generating both unimodal and multimodal (e.g., bimodal) predictions. Accordingly, by building an effective framework and generating both unimodal and multimodal predictions, quantitative explanations on the model predictions for the test sample with missing modality may be obtained. That is, a quantitative measurement that may explain why and how the two modalities (e.g., image and tabular data) are combined, and a confidence factor of the combined prediction may be generated.

Figure 3:
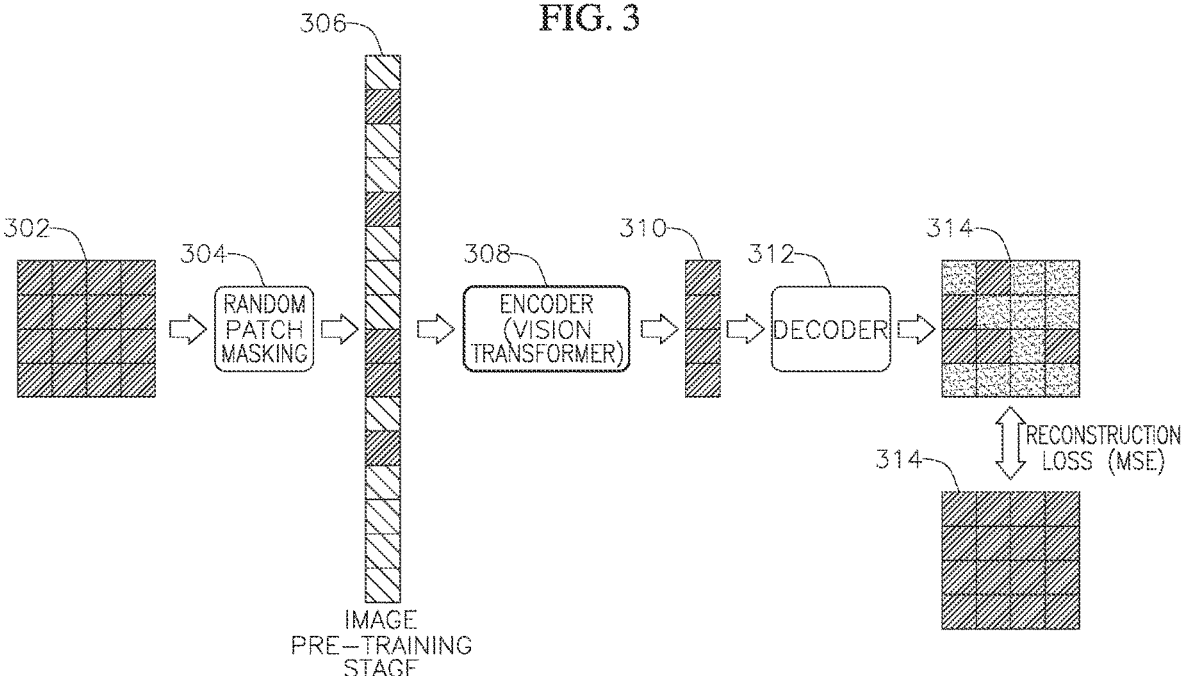
FIGS. 3-4 are example block diagrams of an image pre-training stage and a tabular pre-training stage, respectively, according to embodiments of the present disclosure.
Figure 4:
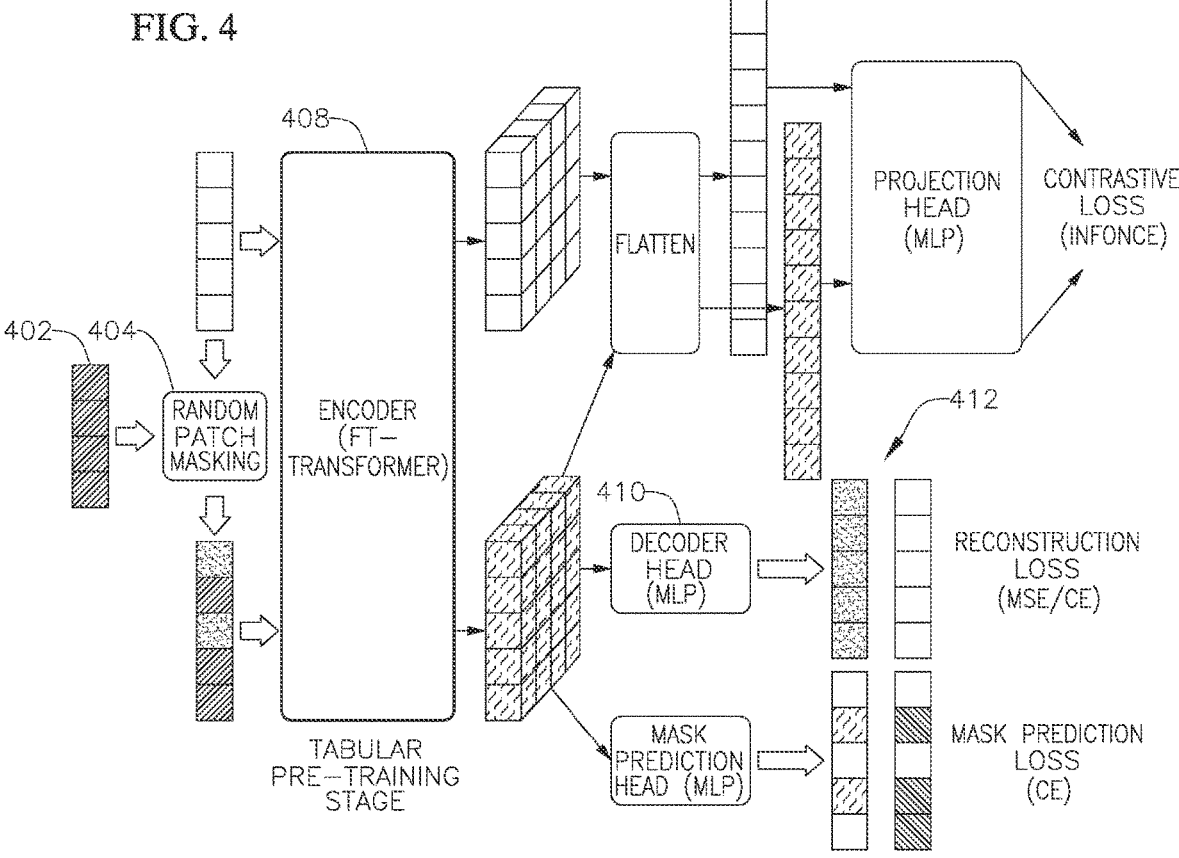

FIGS. 3-4 are example block diagrams of an image pre-training stage and a tabular pre-training stage, respectively, according to various embodiments of the present disclosure. Accordingly, the image pre-training stage in FIG. 3 uses a reconstructive pre-training image model such as, for example, a Vision Transformer technique described in He, Kaiming, et al. "Masked autoencoders are scalable vision learners." *Proceedings of the IEEE/CVF Conference on Computer Vision and Pattern Recognition.* 2022., the contents of which are incorporated herein by reference in its entirety, as an encoder 308. Thus, the encoder 308 may be trained to generate representations or embeddings for images. In some embodiments, the Vision Transformer technique randomly masks 304 about 75% patches of an original image 302, and the encoder 308 generates a prediction of the masked patches at the encoder output 310. A decoder may then be used to form an image 314 together to best represent what the original image looked like. Accordingly, an image reconstruction encoder 308 may be trained during this pre-training phase to reconstruct input images that are masked. After this pre-training stage is completed, the encoder 308 is now trained and this encoder 308 may now be used in operation (e.g., when operating a display panel defect classification system). In other words, the masking 304 or decoder 312 are no longer utilized.

According to another embodiment, the tabular pre-training stage in FIG. 4 trains a tabular model by combining the Scarf and Vime techniques disclosed in Bahri, Dara, et al. "Scarf: Self-Supervised Contrastive Learning using Random Feature Corruption." *International Conference on Learning Representations*. 2021., and Yoon, Jinsung, et al. "Vime: Extending the success of self-and semi-supervised learning to tabular domain." *Advances in Neural Information Processing Systems* 33 (2020): 11033-11043, the contents of which are all incorporated herein by reference in their entirety, and train a Feature-Tokenizer Transformer as a tabular encoder to generate representations or embeddings for the table. More details of the Feature-Tokenizer Transformer technique is described in Gorishniy, Yury, et al. "Revisiting deep learning models for tabular data." *Advances in Neural Information Processing Systems* 34 (2021): 18932-18943, the contents of which are incorporated herein by reference in its entirety. Accordingly, randomly corrupt entries of table samples with values draw according to its marginal probability, and use multilevel perception (MLP) decoders to learn by comparison and denoising. Thus, as illustrated in FIG. 4, an encoder 408 such as the Feature-Tokenizer Transformer takes an original tabular input 402 that is randomly corrupted 404, and the output from the encoder 408 is decoded by a decoder 410 in an effort to reconstruct the original tabular data 412. As with the image encoder of FIG. 3, after this pre-training stage is completed, the tabular encoder 408 is now trained and this encoder 408 may now be used (together with the image encoder 308) in operation (e.g., when operating a display panel defect classification system). In other words, the corruptor 404 or the decoder 410 are no longer utilized.

After the pre-training phases are completed, the model encoders for image modality and tabular modality are ready to be used for operations such as defect classification. Accordingly, when the encoder receives a data set, for example, from sensors that collect raw information such as images and tabular data, the data set may be missing modalities. That is, some rows of the data set may include just an image modality or just a tabular modality, whereas some rows may comprise a complete pair that includes both an image modality and a tabular modality. According to some embodiments, the missing modalities may be imputed in the latent space by imputing the missing embedding by interpolating existing embeddings of the same modality from existing modal-complete pairs instead of generating from other observed modality. In other words, the imputation is performed by interpolating embeddings from a corresponding same modality at another row of data that has a complete paired modality.

Figure 5:
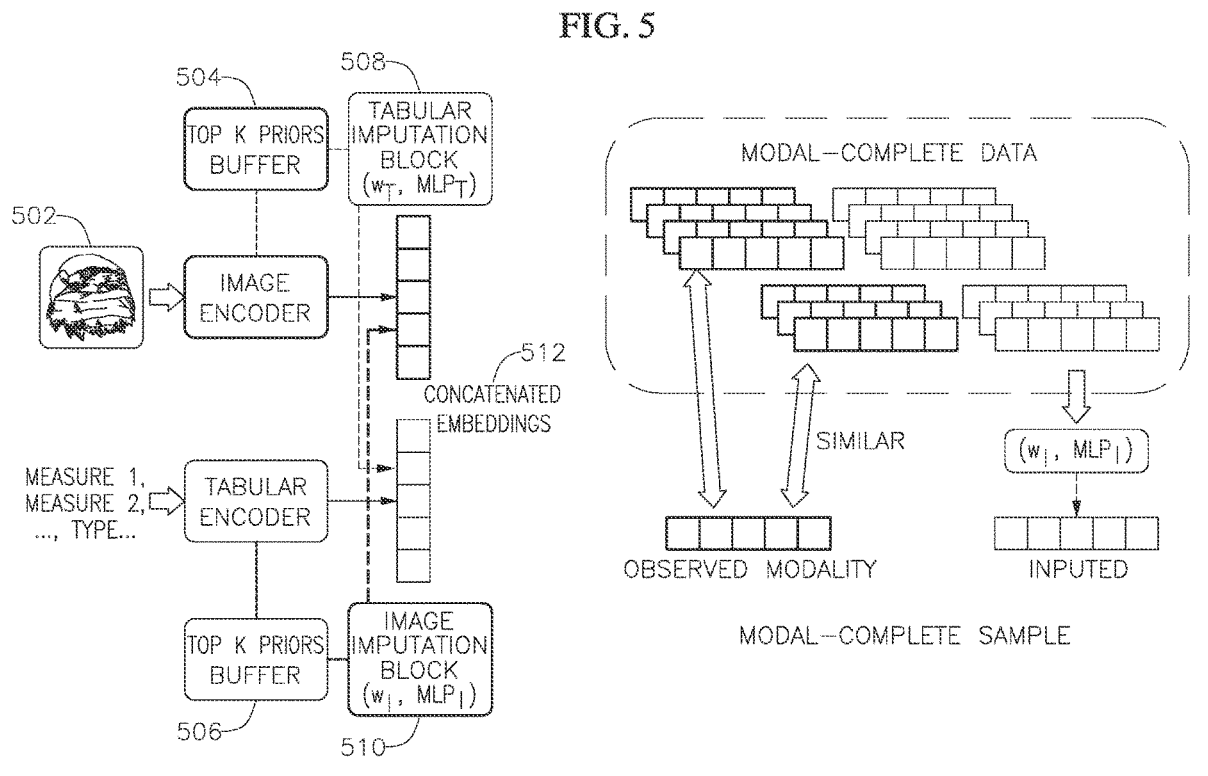

FIG. 5 is a block diagram of an imputation process for missing modality, according to some embodiments of the present disclosure. Here, data set 502 may be an incomplete modality in that an image modality or a tabular modality may be missing. Thus, if the sample that lacks certain modality $e_{missing}$, K priors may be selected from the paired data. For example, if the tabular modality is the missing modality, then the K priors may be selected from K samples of the modal-complete pair 504 to interpolate embeddings for the image modality from the K samples. In some embodiments, K priors may selected as the sample with embeddings that are closest to the embeddings of the observed modality (i.e., the image modality), which may be measured by cosine similarity between embeddings of the observed modality $e_{observed}$. Then a weighted sum over the K prior embeddings of the missing modality (i.e., tabular modality) with weights $w_j$ may be calculated by taking a cross-attention between the K sample and the K priors. The weighted sum may then pass through a shallow (e.g., 2-layer) $MLP_j$ to generate the imputation embedding at the tabular imputation block 508. Finally, the interpolated embeddings may be combined with the observed embeddings to generate concatenated embeddings 512.

Similarly, if the image modality if the missing modality, the K priors may be selected from K samples of the modal-complete pair 506 to interpolate embeddings for the tabular modality from the K samples. In some embodiments, K priors may selected as the sample with embeddings that are closest to the embeddings of the observed modality (i.e., the tabular modality), which may be measured by cosine similarity between embeddings of the observed modality $e_{observed}$. Then a weighted sum over the K prior embeddings of the missing modality (i.e., image modality) with weights $w_j$ may be calculated by taking a cross-attention between the K sample and the K priors. The weighted sum may then pass through a shallow (e.g., 2-layer) $MLP_j$ to generate the imputation embedding at the image imputation block 510 and the interpolated embeddings may be combined with the observed embeddings to generate concatenated embeddings 512.

After the imputation is performed, each of the image encoder and the tabular encoder may be trained to perform both unimodal (e.g., single modality) and bimodal (e.g., two modalities) prediction to achieve robustness against missing modalities. Accordingly, to do so, the encoders are tested during a testing phase to ensure that the single modality prediction is reliable, and to also ensure that the multimodality prediction is also reliable.

Figure 6:
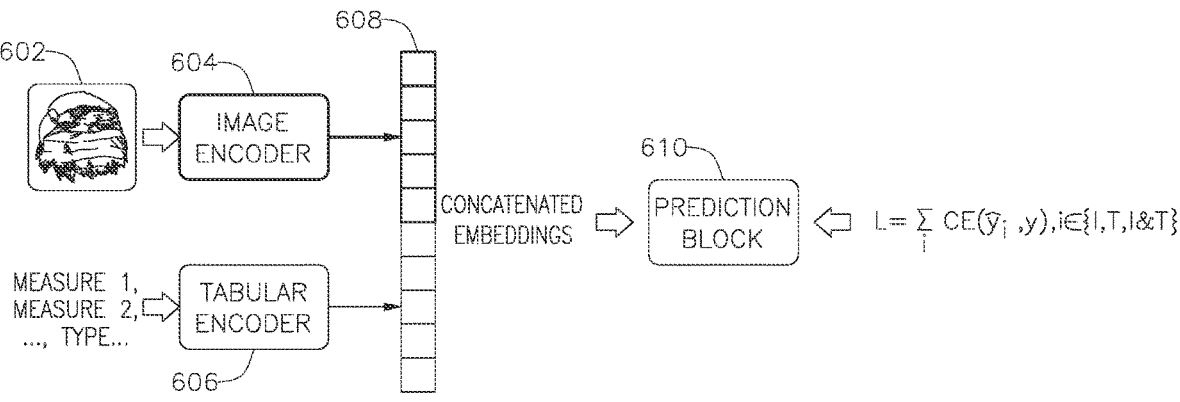
FIG. 6 is an example block diagram of a testing stage, according to embodiments of the present disclosure.

FIG. 6 is an example block diagram of the testing stage. Here, a data set 602 obtained from a raw input is provided to modality-specific encoders, more specifically, an image encoder 604 and a tabular encoder 606. Here, after extracting representations of each modality, the representations may then be concatenated and then provided to a prediction block 610. In some embodiments, the prediction block 610 may be a relatively shallow (e.g., 2-layer) transformer. In this way, the encoders 604, 606 may be fined tuned together with the prediction block 610.

In some embodiments, the prediction block (e.g., transformer) may have three classification tokens ($CLS_i$, $I \in \{I,T, I\&T\}$), where I corresponds to image-based predictions, T corresponds to table-based predictions, and I&T corresponds to bimodal-based predictions. Thus, during training, the attention is masked such that the unimodal classification token only sees tokens in its corresponding modality, whereas the bimodal classification sees all of the tokens. Those classification tokens may be masked from each other. In some embodiments, the transformer may be trained with three cross-entropy losses to achieve robustness against missing modalities. More details are explained in Ma, Mengmeng, et al. "Are Multimodal Transformers Robust to Missing Modality?." *Proceedings of the IEEE/CVF Conference on Computer Vision and Pattern Recognition*. 2022, which is incorporated herein by reference in its entirety.

Figure 7:
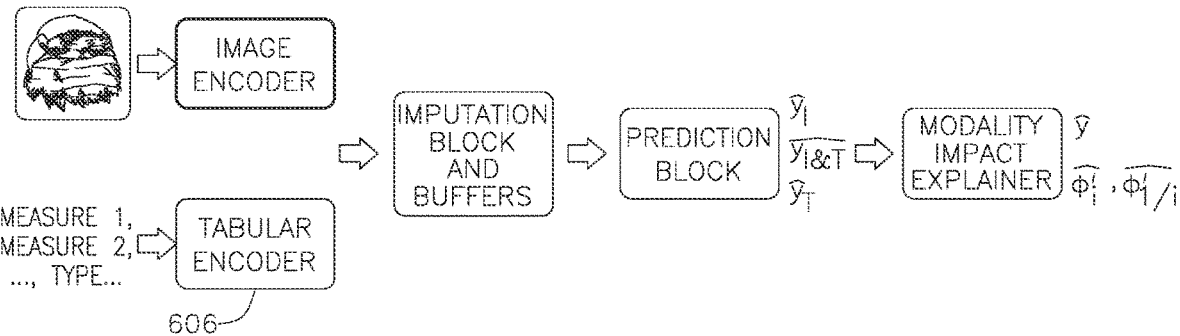
FIG. 7 is an example block diagram of a framework for training and inference, according to embodiments of the present disclosure.

FIG. 7 is an example block diagram of a framework for training and inference, according to various embodiments of the present disclosure. As discussed above, the prediction block has three classification tokens and the output from the prediction block is provided to a modality impact explainer block 702. In some embodiments, an impact of each modality i on the prediction v may be measured using Shapley value by looking at the difference between predictions made with and without it. Accordingly, a quantitative measurement of the importance of each modality may be generated by the impact explainer block 702 such that a determination may be made as to how each modality may impact the model, which in turns impacts the predictions made by the model.

In some embodiments, a FastSHAP estimation technique described in Jethani, Neil, et al. "FastSHAP: Real-Time Shapley Value Estimation." *International Conference on Learning Representations.* 2021, incorporated herein by reference in its entirety, may be utilized to performed amortized estimation. Assuming that the classification model is parameterized with θ, another multilevel perception (MLP) (β) may be trained as the estimator to get proxy of Shapley values (ϕ'), wherein:

$$\phi = \phi' + \left(p(y|1;\theta) - p(y|\emptyset;\theta) - 1^T\phi'\right)$$

The MLP may be trained to minimize the following loss:

$$\mathcal{L} = \left(p(y|m;\theta) - p(y|\emptyset;\theta) - m^T \widehat{\phi_\beta}\right)^2$$

where m is a binary mask to mask one of the two modalities, sampled from {[1,0], [0,1], [1,1], [0,0]} with probability $$p(m) \propto d - 1 / \binom{d}{1^T m} \cdot 1^T m \cdot (d - 1^T m).$$

Next, the impact of observed modality ($\widehat{\phi_i}$) and missing modality ($\widehat{\phi_{1/i}}$) may be compared with a confidence threshold τ, and generate the final predictions accordingly.

$$\hat{y} = \begin{cases} \widehat{y_{I\&T}} & \text{if both modality } I \text{ and } T \text{ are observed} \\ \hat{y}_i & \text{if only } i \text{ is observed and } |\widehat{\phi_i}| - |\widehat{\phi_{1/i}}| > \tau \\ \widehat{y_{I\&T}} & \text{otherwise} \end{cases}$$

Accordingly, the Shapley values may be utilized to determine a confidence value for the unimodal and bimodal predictions so that the one with a high confidence value may be selected and this may be used by the encoder for the fusion of missing unpaired image and tabular data. Accordingly, a computer may be programmed with a neural network that is configured to take raw image and tabular data from sensor devices at a manufacturing facility, and automatically identify defects in the fabricated product (e.g., a display panel).

FIG. 8 is a flow chart of a method for fusing missing and unpaired image and/or tabular modalities, according to various embodiments of the present disclosure. In some embodiments, a data set comprising rows of data is provided. Each row of data may include columns for at least two modalities. According to an example, one of the modalities may be an image modality and another modality may be a tabular modality. Thus, in a desirable scenario, a row of data would include both the image and the tabular modalities. However, the techniques provided in the present disclosure describe methods for providing a modality when one of the two modalities is missing. Thus, in some embodiments, the rows of data may include at least one row of unpaired modality and at least another row of data that includes a paired modality (802). In other words, the unpaired modality may include a first modality (which may be e.g., an image modality or a tabular modality) and the second modality may be missing, hence the modality is unpaired in this row. The other row that includes the paired modality includes both the first modality and a second modality, e.g., both the image modality and the tabular modality are present. Next, a modality-specific encoder may be utilized to impute the at least one row of the unpaired modality by interpolating embeddings from the second modality of the paired modality (804). In other words, the missing modality, which in this example is the second modality, may be imputed by interpolating existing data of the same modality as the missing modality from an available modal-complete pair. Next, the modality-specific encoder may be trained in latent space based on the imputation of unimodal prediction and bimodal prediction (806), and a confidence value for the unimodal prediction and the bimodal prediction may be generated (808). In some embodiments, the confidence value may be generated by computing Shapley-based explanations, which are quantitative measurements corresponding to the importance of each modality. Accordingly, such explanations quantify how each modality may impact the model.

Figure 9:
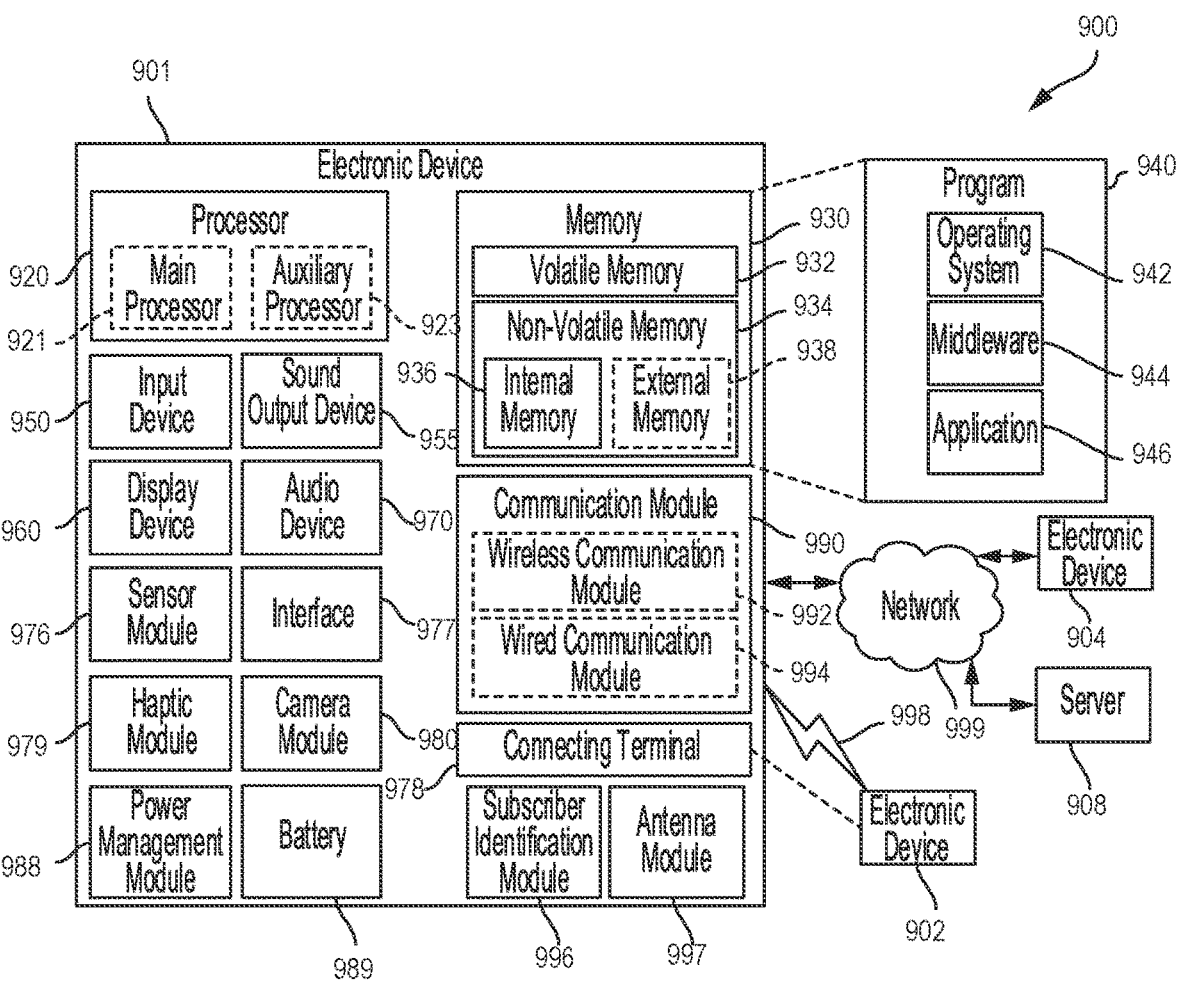
FIG. 9 is a block diagram of an electronic device in a network environment, according to embodiments of the present disclosure.

FIG. 9 is a block diagram of an electronic device in a network environment 900, according to an embodiment.

Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 940, a sound output device 955, a display device 960, an audio module 970, a sensor module 976, an interface 977, a haptic module 979, a camera module 980, a power management module 988, a battery 989, a communication module 990, a subscriber identification module (SIM) card 996, or an antenna module 994. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute software (e.g., a program 940) to control at least one other component (e.g., a hardware or a software component) of the electronic device 901 coupled with the processor 920 and may perform various data processing or computations.

As at least part of the data processing or computations, the processor 920 may load a command or data received from another component (e.g., the sensor module 946 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezo-electric element, or an electrical stimulator.

The camera module 980 may capture a still image or moving images. The camera module 980 may include one or more lenses, image sensors, image signal processors, or flashes. The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

Commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims

What is claimed is:

1. A method, comprising:

providing a first data set comprising rows of data, the rows of data comprising at least one row of unpaired modality comprising a first modality, and at least one row of paired modality comprising both the first modality and a second modality;

imputing, by a modality-specific encoder, the at least one row of unpaired modality by interpolating embeddings from the second modality of the paired modality based on one or more prior embeddings of the second modality of the paired modality;

based on the imputing of the at least one row of the unpaired modality and based on a second set of data, training, in a latent space, the modality-specific encoder for a unimodal prediction of a missing modality and a bimodal prediction of the missing modality; and generating a confidence value for the unimodal prediction and the bimodal prediction.

2. The method of claim 1, wherein the generating the confidence value comprises computing Shapley-based explanations for the unimodal prediction and the bimodal prediction.

3. The method of claim 2, wherein the computing the Shapley-based explanations comprises comparing an impact of the unimodal prediction and an impact of the bimodal prediction with a predetermined threshold.

4. The method of claim 3, further comprising selecting either the unimodal prediction or the bimodal prediction based on the generated confidence value.

5. The method of claim 1, wherein the second modality is a missing modality from the unpaired modality, wherein the one or more prior embeddings of the second modality of the paired modality comprise K priors of the second modality, and wherein the interpolating the embeddings comprises selecting the K priors of the second modality, the K priors being second modality embeddings of K samples of the at least one row of paired modality having closest embeddings of observed modality.

6. The method of claim 5, further comprising computing a weighted sum of the K priors by taking a cross-attention between the K samples and the K priors.

7. The method of claim 1, wherein the first modality corresponds to an image modality and the second modality corresponds to a tabular modality.

8. The method of claim 1, wherein the first modality correspond to a tabular modality and the second modality corresponds to an image modality.

9. The method of claim 1, further comprising training the modality-specific encoder for image modality by performing Vision Transformer.

10. The method of claim 1, further comprising training the modality-specific encoder for tabular data modality by performing Feature-Tokenizer Transformer.

11. A system, comprising:

a memory; and a processor configured to execute instructions stored in the memory to perform operations comprising:

providing a first data set comprising rows of data, the rows of data comprising at least one row of unpaired modality comprising a first modality, and at least one row of paired modality comprising both the first modality and a second modality;

imputing, by a modality-specific encoder, the at least one row of unpaired modality by interpolating embeddings from the second modality of the paired modality based on one or more prior embeddings of the second modality of the paired modality;

based on the imputing of the at least one row of the unpaired modality and based on a second set of data, training, in a latent space, the modality-specific encoder for a unimodal prediction of a missing modality and a bimodal prediction of the missing modality; and generating a confidence value for the unimodal prediction and the bimodal prediction.

12. The system of claim 11, wherein the generating the confidence value comprises computing Shapley-based explanations for the unimodal prediction and the bimodal prediction.

13. The system of claim 12, wherein the computing the Shapley-based explanations comprises comparing an impact of the unimodal prediction and an impact of the bimodal prediction with a predetermined threshold.

14. The system of claim 13, wherein the operations further comprise selecting either the unimodal prediction or the bimodal prediction based on the generated confidence value.

15. The system of claim 11, wherein the second modality is a missing modality from the unpaired modality, wherein the one or more prior embeddings of the second modality of the paired modality comprise K priors of the second modality, and wherein the interpolating the embeddings comprises selecting the K priors of the second modality, the K priors being second modality embeddings of K samples of the at least one row of paired modality having closest embeddings of observed modality.

16. The system of claim 15, wherein the operations further comprise computing a weighted sum of the K priors by taking a cross-attention between the K samples and the K priors.

17. The system of claim 11, wherein the first modality corresponds to an image modality and the second modality corresponds to a tabular modality.

18. The system of claim 11, wherein the first modality correspond to a tabular modality and the second modality corresponds to an image modality.

19. The system of claim 11, wherein the operations further comprise training the modality-specific encoder for image modality by performing Vision Transformer.

20. The system of claim 11, wherein the operations further comprise training the modality-specific encoder for tabular data modality by performing Feature-Tokenizer Transformer.

* * * * *